March 26, 1940.   O. RASMUSSEN ET AL   2,195,261
INTERNAL BRAKE
Filed Sept. 28, 1938   2 Sheets-Sheet 2
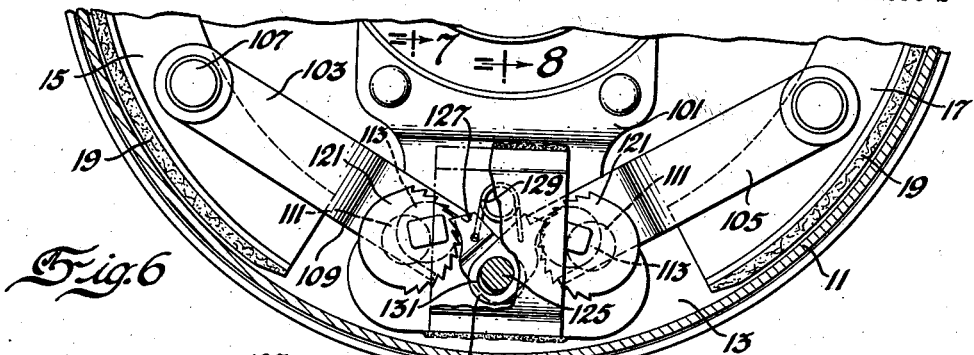
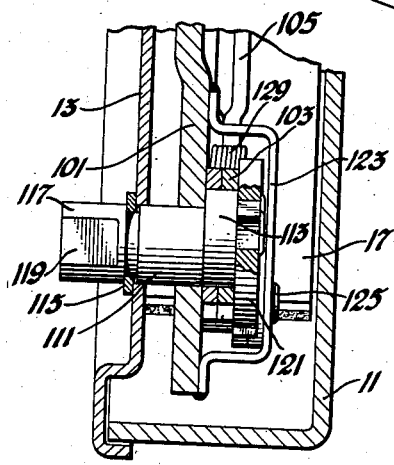
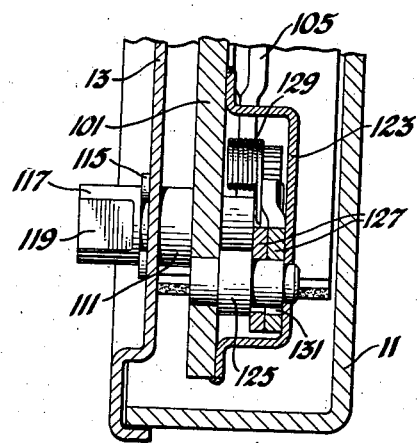
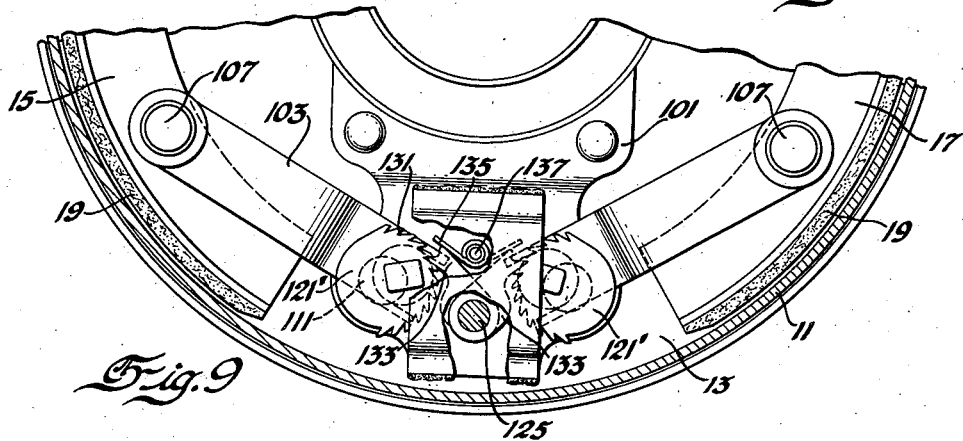
Inventors
Olaf Rasmussen &
Earl R. Pierce
By Blackmore, Spencer & Flint
Attorneys Patented Mar. 26, 1940

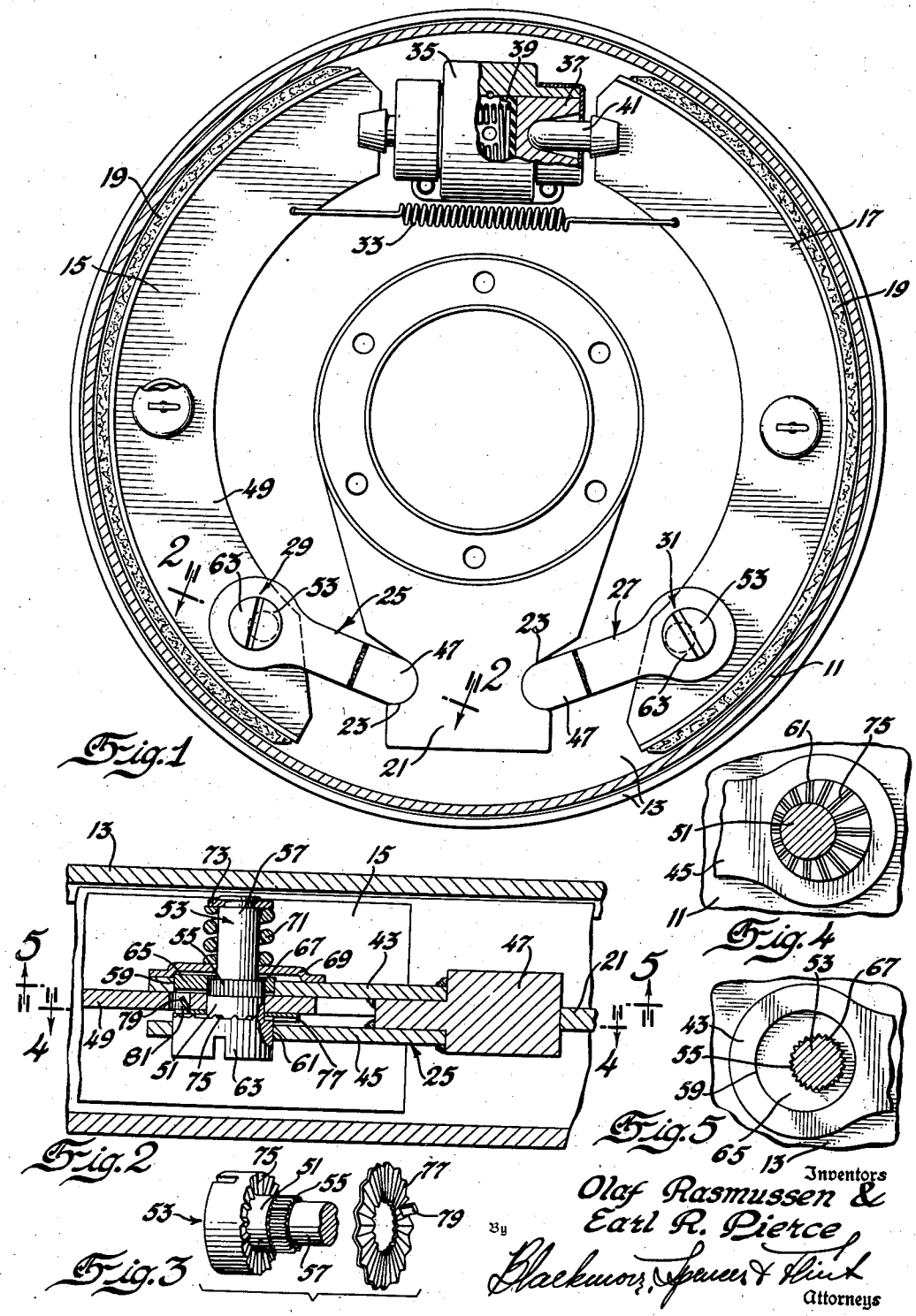

2,195,261

UNITED STATES PATENT OFFICE 2,195,261

INTERNAL BRAKE

Olaf Rasmussen and Earl R. Pierce, Dayton, Ohio, assignors to General Motors Corporation, Detroit, Mich., a corporation of Delaware Application September 28, 1938, Serial No. 232,072

12 Claims. (Cl. 188—79.5)

This invention relates to brakes and particularly to internal brakes such as are used with the wheels of motor vehicles.

The primary object of the invention is to provide improved means for adjusting the clearance of the brake shoes in that type of brakes making use of an articulating link anchorage.

Further objects include improved structural details by which the major object is accomplished, the structure being simple, effective and comparatively inexpensive.

On the drawings:

Figure 1 shows in elevation and partly in section a first embodiment of the invention.

Figure 2 is a section on line 2—2 of Figure 1.

Figure 3 is a perspective of parts shown in Figure 2, the parts being in disassembled relation.

Figure 4 is a section on line 4—4 of Figure 2.

Figure 5 is a section on line 5—5 of Figure 2.

Figure 6 is a view in elevation of a second embodiment of the invention.

Figure 7 is a section on line 7—7 of Figure 6.

Figure 8 is a section on line 8—8 of Figure 6.

Figure 9 is a view in elevation of a slightly modified form.

In the first embodiment of the invention, numeral 11 is used to identify the brake drum, the drum commonly used with a rotating wheel. The conventionally fixed cover plate is identified by numeral 13. Within the drum are shown shoes 15 and 17, each provided with a friction facing 19. Numeral 21 is used to identify an anchor plate which, like cover 13, is fixed in position. This anchor plate may be formed with recesses 23 to receive the thrust from articulating links 25 and 27 which links are pivoted to the shoes by means designated as a whole by numerals 29 and 31. At 35 is shown a substantially conventional wheel cylinder which is to be associated with the usual hydraulic brake system. The wheel cylinder is equipped with pistons 37, sealing means 39 and plungers 41, the latter engaging the shoes. Numeral 33 represents the spring which is used to retract the shoes from contact with the drum.

Since the friction lining 19 becomes worn down in use, resulting in excessive clearance between the shoe and the drum, mechanism is usually provided for reducing this clearance. Adjusting mechanism of this kind is provided in the embodiment under discussion. The adjustment is made at the connection between the articulating links 25 and 27 and the shoes at the points 29 and 31.

In this form of the invention, link 25 is shown as made up of two parallel members 43 and 45. To the end of these members there is welded a thrust block 47 which engages the anchor plate 21. It will be understood that the structure about to be described in connection with link 25 is duplicated in the case of link 27. One member 43 lies against one face of the web 49 of shoe 15. The other member 45 is slightly spaced from the opposite face of the web. A part 51 of a pin 53 rotates within an opening in web 49. Adjacent part 51 is an axial tooth part 55 and extending from part 55 is a spindle 57. Members 43 and 45 have registering openings 59 and 61. The pin 53 has a head 63 which is eccentric to the part 51 and to the spindle. This head is rotatably mounted in the opening 61. A ring 65 of a diameter corresponding to the head and concentric therewith is received within opening 59. This ring 65 is provided with an eccentric opening having teeth 67 to engage teeth 55 of the pin. Overlying ring 65 and spaced therefrom is a cupped disc 69 peripherally engaging member 43 and held in contact therewith by a spring 71 which surrounds the spindle 57 and engages a terminal abutment 73 carried by the spindle at its end. The shoulder of pin 53 between the head 63 and the bearing portion 51 has radial serrations 75 to engage the serrations of a washer 77 located between the head and the web 49. This washer is held from rotation relative to the web by a tongue 79 displaced from the washer and projected into a hole 81 in the web. To effect a manual rotation of the pin 53, a slot is formed in head 63, the slot being intended to be engaged by a suitable tool. If undue clearance develops between the drums and the shoe as a result of wear of the friction lining, the pin 53 may be manually rotated, its head 63 turning in the opening 61 and the ring 65 rotating within the opening 59. In so turning the pin the eccentric portion 51 may move in a direction to bring the shoe toward the drum and take up the excessive clearance. When so rotated the serrated parts separate and re-engage, the spring 71 yielding to permit rotation. The spring 71 also serves to hold the pin in selected positions of adjustment. The resiliently produced pressure between part 43 and the web 49 of the shoe prevents rotation at this point when the shoe is released. When the brake is applied relative rotation between the web and the link against this frictional resistance is made possible, the rotation frequently being needed for the proper centering of the shoe relative to the drum.

Instead of employing the eccentric adjustment between the linkage and the shoe it may be arranged between the linkage and the anchor plate. Such a location is shown in Figures 6, 7 and 8. In these figures the drum, the cover plate and the shoes are marked 11, 13, 15 and 17 as before. At 101 is an anchor plate which, like cover plate 13, is rigidly fixed in position. To each shoe are pivoted the ends of a pair of links 103 and 105 by a pin 107. The links are spaced to straddle the web of the shoe adjacent pivot 107 but are bent into contact at a point between their ends as shown at 109. The anchor plate 101 aided by the cover 13 journals two spaced pins 111. Each of these pins is formed with an eccentric portion 113 to receive the recessed ends of the links 103 and 105. By means of the eccentric 113 and a washer 115 the position of the pin 111 is axially determined. The head of the pin 117 is shaped as at 119 to receive a suitable tool whereby the pin may be rotated. The end of the pin, remote from its head carries a concentric ratchet wheel 121. Between the spaced pins 111 there is an arched bridge plate 123 suitably secured as by welding to the anchor plate. Journaled in the anchor plate and in the arched plate is a pin 125 upon which are rotatably supported two pawls 127, one for engaging the teeth of each ratchet wheel. The pawls are spread apart by a spring 129. The opening within each pawl to receive the pivot pin 125 is elongated as shown by 131, the extent of the elongation being a measure of the shoe clearance when the brakes are released.

In operation it will be understood that the shoes may be applied by a wheel cylinder as in the form of the invention shown by Figure 1, the recessed ends of the articulating links rotate on the eccentric portions 113 of the pins 111. The axial pressure through the linkage tends to rotate the pin 111 owing to the eccentric point of application. Such rotation is resisted by the pawl and ratchet device. The spring 129 not only spreads the pawls so that they engage the teeth of the ratchets but it tends to hold the pawls in a position such that the clearance around the pins 125 is diametrically opposite its location as shown in Figure 6. Upon release of the brake applying means the extent of eccentricity of the eccentric 113 and the length of the slot in the pawl determines the clearance between the drum and the shoe. If this clearance is excessive, adjustment may be necessary. To make the adjustment, pin 111 is manually rotated, the eccentric thus pushing the shoe through the instrumentality of the linkage into contact with the drum. Simultaneously spring 129 lifts the pawl so that its clearance is diametrically opposite the position shown. At the moment of drum contact the pawl tooth will engage at some indeterminate point along a ratchet tooth. After such adjustment the pin 111 is manually rotated in a reverse direction to a limiting position determined by the positive engagement of the pawl and ratchet teeth and by the engagement of the pawl slot with its pivot as shown by Figure 6.

In Figure 9 is shown a slight modification. In this form of the invention the drum, the cover plate, shoes, anchor plate and linkage are identified as in Figure 6. There is no change in the pin 111 with the exception that in place of ratchet wheel 121 there is a ratchet wheel 121' provided with undercut teeth 131. A specially shaped pawl 133 is also used and a modified form of spring, a flat spring 135 anchored at 137, engages the two pawls. The pawls rotate upon pivot pin 125 as before but they are not provided with the elongated opening shown in Figure 6. In the form shown in Figure 6 when the tooth of the pawl drops from one ratchet to the tooth next it engages the extreme inner end of that next tooth. In Figure 9 the teeth are undercut as explained above so that when the pawl drops to a next tooth there remains beyond the end of the pawl an undercut extension. This undercut extension performs the function of the elongation of the bearing opening in the pawl which is shown and has been described in the case of Figure 6.

We claim:

1. In a brake, a drum, shoes to frictionally engage the drum, means to effect such frictional engagement, a fixed anchorage, link means pivoted to said anchorage and to one of said shoes at a point spaced from its end, and mechanism associated with one of said pivoted connections to adjust the clearance between said shoe and said drum without affecting the position of the other shoe.

2. The invention defined by claim 1, said mechanism including a pin rotatable within said link means and also rotatable about an eccentric axis with the connected member.

3. In a brake, a drum, shoes to frictionally engage the drum, means to effect such frictional engagement, a fixed anchorage, link means pivoted to said anchorage and to one of said shoes at a point spaced from its end, the connecting means between said link means and said shoe comprising a pin having axially displaced eccentric parts rotatably mounted in the link and in the shoe.

4. In a brake, a drum, shoes to frictionally engage the drum, means to effect such frictional engagement, a fixed anchorage, link means pivoted to said anchorage and to one of said shoes at a point spaced at its end, the connecting means between said link means and said shoe comprising a pin having axially displaced eccentric parts rotatably mounted in the link and in the shoe, together with yielding means to maintain said shoe and link in positions of eccentric adjustment.

5. In a brake, a drum, a shoe to frictionally engage the drum, means to effect such frictional engagement, a fixed anchorage, link means between and pivotally connected to both said shoe and said anchorage, the pivotal connection between said shoe and link comprising a pin having a head journaled in one of said parts, an eccentric portion journaled in the other part, a spindle co-axial with said eccentric part, a spring surrounding said spindle and a member actuated by the yielding pressure of said spring to frictionally resist relative rotation of said link and shoe.

6. In a brake, a drum, a shoe to frictionally engage the drum, means to effect such frictional engagement, a fixed anchorage, link means between and pivotally connected to both said shoe and said anchorage, said link means comprising two links straddling the web of said shoe, the pivotal connection between the shoe and the link means comprising a pin having a head journaled in one of said links, an axially spaced eccentric journaled in said shoe, a detachable member concentric with said head, journaled in the other link and non-rotatably mounted on said pin, said pin formed with a spindle, a plate mounted on said spindle and a spring surrounding the said spindle and pressing said plate into frictional contact with the second link.

7. In a brake, a drum, a shoe to frictionally engage the drum, means to effect such frictional engagement, a fixed anchorage, link means between and pivotally connected to both said shoe and said anchorage, said link means comprising two links straddling the web of said shoe, the pivotal connection between the shoe and the link means comprising a pin having a head journaled in one of said links, an axially spaced eccentric journaled in said shoe, a detachable member concentric with said head, journaled in the other link and non-rotatably mounted on said pin, said pin formed with a spindle, a plate mounted on said spindle and a spring surrounding the said spindle and pressing said plate into contact with the second link.

8. In a brake, a drum, first and second shoes to frictionally engage the drum, means to effect frictional engagement, a fixed anchorage, link means pivoted to said anchorage and to said first shoe at a point spaced from its end, the connecting means between said link means and said anchorage comprising a pin having axially displaced eccentric parts rotatably mounted in said link means and said anchorage, said rotation being without effect on said second shoe.

9. In a brake, a drum, first and second shoes to frictionally engage the drum, means to effect frictional engagement, a fixed anchorage, link means pivoted to said anchorage and to said first shoe at a point spaced from its end, the connecting means between said link means and said anchorage comprising a pin having axially displaced eccentric parts rotatably mounted in said link means and said anchorage, together with a ratchet wheel on said pin and a pivoted pawl on said anchorage to engage said ratchet, said adjusting means being without effect on said second shoe.

10. In a brake, a drum, a shoe to frictionally engage the drum, means to effect frictional engagement, a fixed anchorage, link means between and pivotally connected to both said shoe and said anchorage, the connecting means between said link means and said anchorage comprising a pin having axially displaced eccentric parts rotatably mounted in said link means and said anchorage, together with a ratchet wheel on said pin and a pivoted pawl on said anchorage to engage said ratchet, said pawl having a slot embracing its pivot and yielding means to bias said pawl into engagement with said ratchet and to one position of axial adjustment relative to said pivot.

11. In a brake, a drum, first and second shoes to frictionally engage the drum, means to effect frictional engagement, a fixed anchorage, first and second links, said links being pivoted at spaced points to said anchorage and to said shoes at points spaced from their ends, the connecting means between each link and said anchorage comprising a pin having axially displaced eccentric parts rotatably mounted in said link and said anchorage, cooperating pawl and ratchet means on said anchorage and pin, said ratchet means having undercut teeth to provide a predetermined clearance between the shoe and the drum.

12. In a brake, a drum, two opposed shoes, means to spread said shoes, a fixed anchorage, link means between each shoe and said anchorage and pivoted to both, the pivotal connections with the anchorage employing pins having eccentric portions for rotation in openings in the anchorage and in the links, pawls carried by said anchorage between said pins, each pin having a ratchet, and yielding means to spread said pawls into locking engagement with said ratchets.

OLAF RASMUSSEN.
EARL R. PIERCE.